United States Patent [19]

Orii et al.

[11] Patent Number: 4,984,666
[45] Date of Patent: Jan. 15, 1991

[54] SPEED GOVERNOR FOR TOILET OR THE LIKE

[75] Inventors: Makoto Orii; Hiroyuki Iwashita, both of Nagano, Japan

[73] Assignee: Kabushiki Kaisha Sankyo Seiki Seisakusho, Nagano, Japan

[21] Appl. No.: 337,808

[22] Filed: Apr. 14, 1989

[30] Foreign Application Priority Data

| Apr. 14, 1988 | [JP] | Japan | 63-92336 |
| Aug. 19, 1988 | [JP] | Japan | 63-206094 |
| Aug. 19, 1988 | [JP] | Japan | 63-206095 |
| Oct. 7, 1988 | [JP] | Japan | 63-253207 |

[51] Int. Cl.$^5$ .............................................. F16D 67/02
[52] U.S. Cl. .......................................... 192/7; 4/236; 4/241; 192/12 B; 192/41 S; 192/48.92; 192/81 C
[58] Field of Search ............ 192/7, 8 R, 12 B, 12 BA, 192/41 S, 48.92, 81 C; 4/236, 240, 241

[56] References Cited

U.S. PATENT DOCUMENTS

| 3,307,660 | 3/1967 | Sheckells | 188/185 |
| 3,361,235 | 1/1968 | Sacchini | 192/8 R |
| 3,474,470 | 10/1969 | Watson | 4/240 |
| 4,276,637 | 6/1981 | Lowery | 192/415 |
| 4,561,130 | 12/1985 | Bumgardner et al. | 4/236 |
| 4,610,339 | 9/1986 | Ciolli | 192/81 C |
| 4,639,147 | 1/1987 | Schwarz | 4/240 |
| 4,838,333 | 6/1989 | Mottura | 192/12 B |

FOREIGN PATENT DOCUMENTS

| 0103517 | 3/1984 | European Pat. Off. . |
| 1035480 | 1/1959 | Fed. Rep. of Germany . |
| 3722114 | 1/1988 | Fed. Rep. of Germany . |
| 2336538 | 7/1977 | France . |

Primary Examiner—Rodney H. Bonick
Assistant Examiner—Nicholas Whitelaw
Attorney, Agent, or Firm—Sughrue, Mion, Zinn, Macpeak & Seas

[57] ABSTRACT

Braking of independently-movable pivotable members is carried out by independent one-way clutch mechanisms which provide minimal braking force to the pivotable members in the vicinity of the limit points of their pivotable movement, and provide optimal braking force in a middle range of pivotable movement. The braking mechanism provided may operate on one or both of the pivotable members at the same time, each of the independent clutch mechanisms providing suitable braking force to compensate for the mass of the respective pivotable members.

19 Claims, 17 Drawing Sheets

FIG. 1
FIG. 2
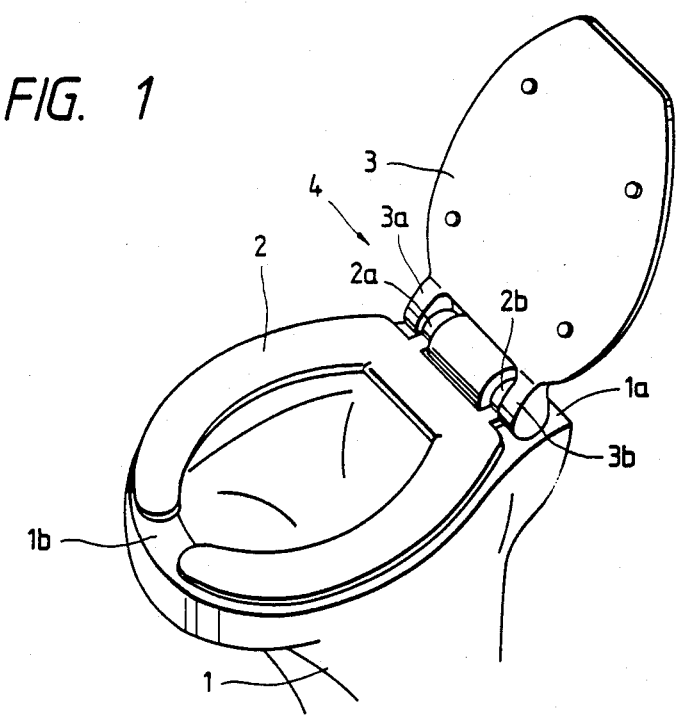
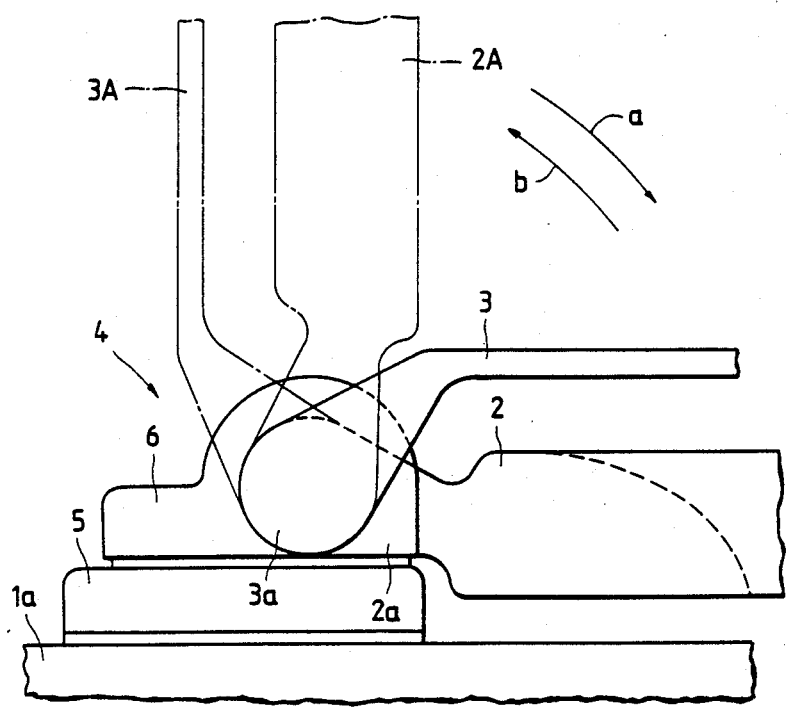

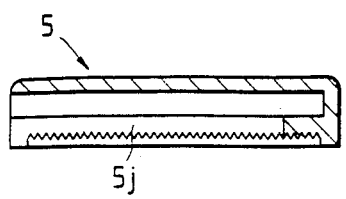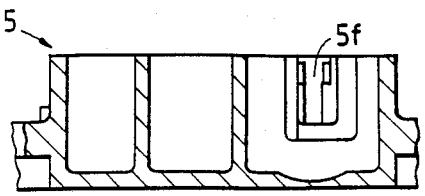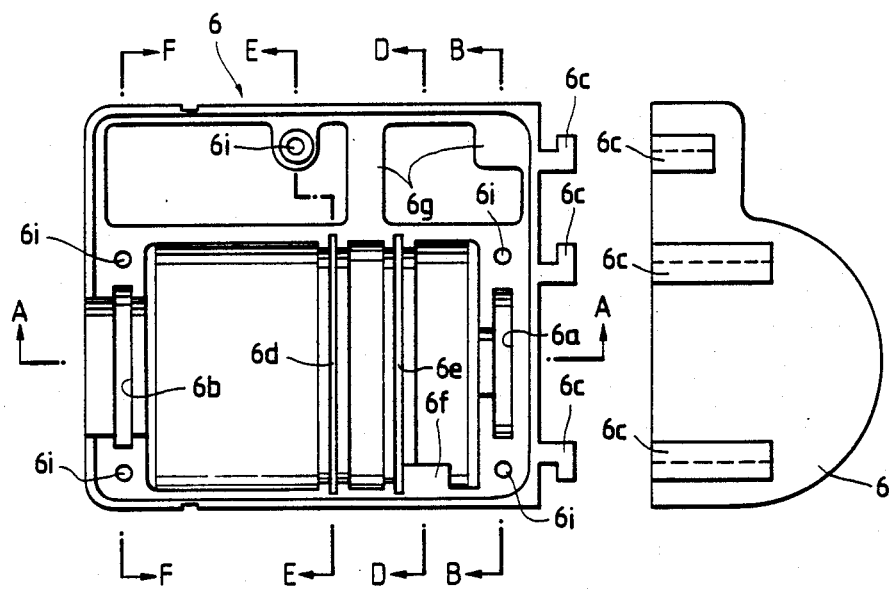

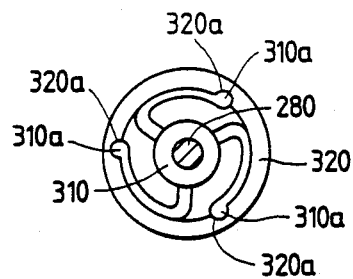
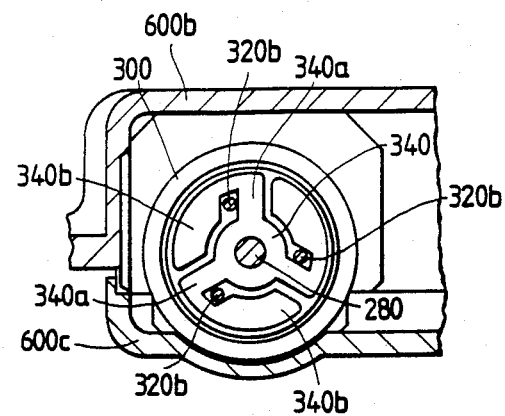
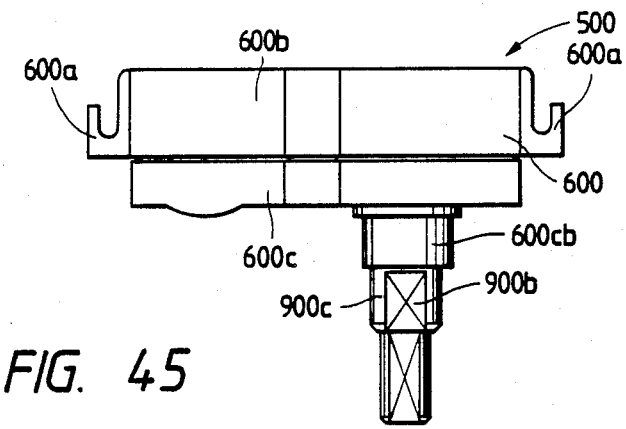

SPEED GOVERNOR FOR TOILET OR THE LIKE

BACKGROUND OF THE INVENTION

This invention relates to a speed governor for use in a toilet or other structure having two openable closure members which are rotatable about an axis or center of rotation, and more specifically for use in a toilet having a toilet seat and a lid, a container having an openable lid, or the like.

For example, a western-style toilet includes a toilet seat mounted on a horizontal support shaft for pivotable movement. In accordance with the mode of use of the toilet, the toilet seat is pivotably movable between a closed position in which the toilet seat is held against the upper edge or rim of an open top of a toilet bowl or body, and an open position in which the toilet seat is spaced away from the upper edge of this open top. When the toilet seat is released during movement from the open to closed position, the seat descends pivotably by its own weight so that it strikes the upper edge of the toilet bowl to produce a great impact sound and in the worst case the seat is broken. This also is the case With the lid.

To deal with the above problems, speed governors have been proposed which brake the pivotable movement of the toilet seat. Examples of such governors include one utilizing a pneumatic cylinder (Japanese Patent Publication No. 37975/87 and Japanese Laid-Open (Kokai) Utility Model Application No. 118498/86) one utilizing a coil spring (Japanese Laid-Open (Kokai) Patent Application No. 106423/85 and Japanese Laid Open (Kokai) Utility Model Application Nos. 164596/84 and 32851/75), and one utilizing an oil damper (Japanese Laid-Open (Kokai) Utility Model Application No. 32851/75).

In the speed governor of the pneumatic cylinder type, the braking action begins from the start of the pivotable movement of the toilet seat, and therefore it suffers from the drawback that it takes a long time for the toilet seat to move. Also, the device becomes bulky. In the speed governor of the coil spring type, the torque of the pivotable movement of the toilet seat and the resilient force of the spring are designed to be in equilibrium, and therefore there is a problem in that a damping action occurs in the vicinity of the point of balance. The speed governor of the oil damper type has a problem that its construction becomes bulky since it must be constructed to protect against oil leakage.

A common drawback of all the above types is that when the mass of the toilet seat is changed (for example, as a result of attachment of a seat cover thereto), the braking force is varied, so that the intended function can not be completely fulfilled. Particularly where the speeds of the toilet seat and the toilet lid are to be regulated independently of each other, there is a problem in that the number of the component parts is increased, so that assembly efficiency is lowered The above problems are not limited to the toilet, but are encountered with a garbage box with a lid, a piece of furniture with an openable lid, and so on.

SUMMARY OF THE INVENTION

A first object of this invention is to provide a speed governor for a toilet or the like in Which the speeds of closing movement of two pivotable members (e.g., a toilet seat and a lid) can be regulated by one brake mechanism, and the pivotable movement in one direction (for example, in the opening direction) can be made lightly. With respect to the pivotable movement in the other direction (the closing direction), there is little difference between the time required for the pivotable movement of one of the two pivotable members and the time required for the simultaneous pivotable movement of both pivotable members.

A second object of the invention is to provide a speed governor for a toilet or the like in which there is no oil leakage encountered, in which stable speed regulation can be achieved regardless of a variation in mass of the pivotable members, and in which the number of the component parts is small so that assembly is efficient.

According to the present invention, a brake is rotatably connected through independent one-way transmission clutches to two pivotable members, such as a toilet seat and a lid, which are pivotably movable independently of each other. The brake has a speed-increasing portion for increasing the input rotation, and a brake portion at a final stage of the speed-increasing portion.

According to another aspect of the present invention, there is provided a speed governor for a toilet or the like having first and second pivotable members each rotatable about an axis of rotation, the speed governor including:

a first input shaft rotatable about the axis of rotation and connected to the first pivotable member;

a second input shaft rotatable about the first input shaft and connected to the second pivotable member;

a driven rotatable member rotatable about the above axis of rotation;

a first one-way transmission clutch provided between the first input shaft and the driven rotatable member, the first clutch transmitting the rotation of the first input shaft to the driven rotatable member when the first input shaft is rotated in a first direction, and the first clutch not transmitting the rotation of the first input shaft to the driven rotatable member when the first input shaft is rotated in a second direction opposite to the first direction;

a second one-way transmission clutch provided between the second input shaft and the driven rotatable member, the second clutch transmitting the rotation of the second input shaft to the driven rotatable member when the second input shaft is rotated in a first direction and the second clutch not transmitting the rotation of the second input shaft to the driven rotatable member when the second input shaft is rotated in a second direction; and a brake mechanism, connected to the driven rotatable member, for braking the driven rotatable member when the driven rotatable member is rotated thereby braking the rotation of the input shaft rotating the rotatable member.

According to a further aspect of the invention, there is provided a speed governor for a toilet or the like having a reciprocally-pivotable member, the speed governor including:

an input shaft coupled substantially integrally to the pivotable member;

a brake mechanism, operable in response to angular movement of the input shaft, for braking the angular movement of the input shaft (that is, the pivotable movement of the pivotable member);

a one-way transmission clutch, provided between the brake mechanism and the input shaft, for transmitting the angular movement of the input shaft to the brake mechanism when the input shaft is angularly moved in a first direction, the clutch not transmitting the angular movement of the input shaft to the brake mechanism when the input shaft is angularly moved in a second direction opposite the first direction; and a brake release, provided between the input shaft and the brake mechanism, for releasing the operation of the brake mechanism at a final stage of the angular movement of the input shaft in the first direction.

BRIEF DESCRIPTION OF THE DRAWINGS

FIG. 1 is a perspective view of a toilet incorporating a speed governor according to a first embodiment of the present invention;

FIG. 2 is a fragmentary side-elevational view of the toilet, showing the and closing directions of pivotable members;

FIG. 22 is a cross-sectional view taken along the line H—H of FIG. 14;

FIG. 23 is a cross-sectional view taken along the line J—J of FIG. 14;

FIG. 24 is a bottom view of a cover;

FIG. 25 is a right side-elevational view of the cover of FIG. 24;

FIG. 43 is a bottom view of one example of a brake;

FIG. 44 is a bottom view of one example of a torque limiter;

FIG. 45 is a partially cross-sectional, fragmentary, plan view showing the manner of connection between input shafts and pivotable members;

DETAILED DESCRIPTION OF THE PREFERRED EMBODIMENTS

Figure 3:
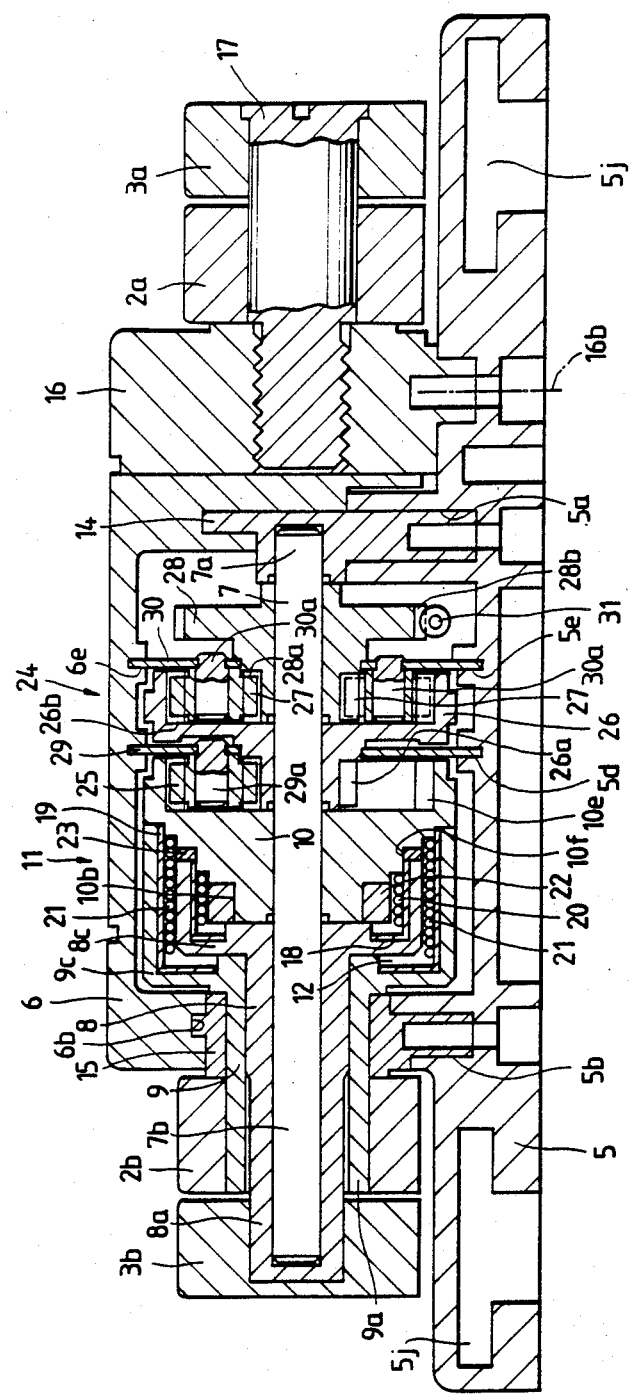
FIG. 3 is a vertical cross-sectional view of the speed governor of the first embodiment.

A first embodiment of the present invention, shown in FIGS. 1 to 37, now will be described in detail.

In FIG. 1, a toilet seat 2 (hereinafter referred to merely as "seat"), serving as a second pivotable member, and a lid 3 (hereinafter referred to merely as "lid"), serving as a first pivotable member, are pivotably or angularly-movably mounted on a rear end 1a of an upper edge of a body 1. The seat 2 and the lid 3 are connected through their hinge portions 2a, 2b and 3a, 3b to a speed governor 4 fixedly mounted on the rear end 1a. In FIG. 1, the seat 2 is in a closed position where the seat 2 is disposed substantially horizontally and held against the upper edge 1b of the opening of the body, and the lid 3 is in an open position where the lid 3 exposes the opening of the body and is standing upright away from its closed position The seat 2 is pivotably movable between its open position, indicated by a dash-and-dot line 2A in FIG. 2, and its closed position indicated by a solid line. The lid 3 is also pivotably movable between its closed position, indicated by a solid line, and its open position, indicated by a dash-and-dot line 2B in FIG. 2. The seat 2 and the lid 3 can be pivotably moved between their open and closed positions in unison in overlapping relation to each other.

Figure 4:
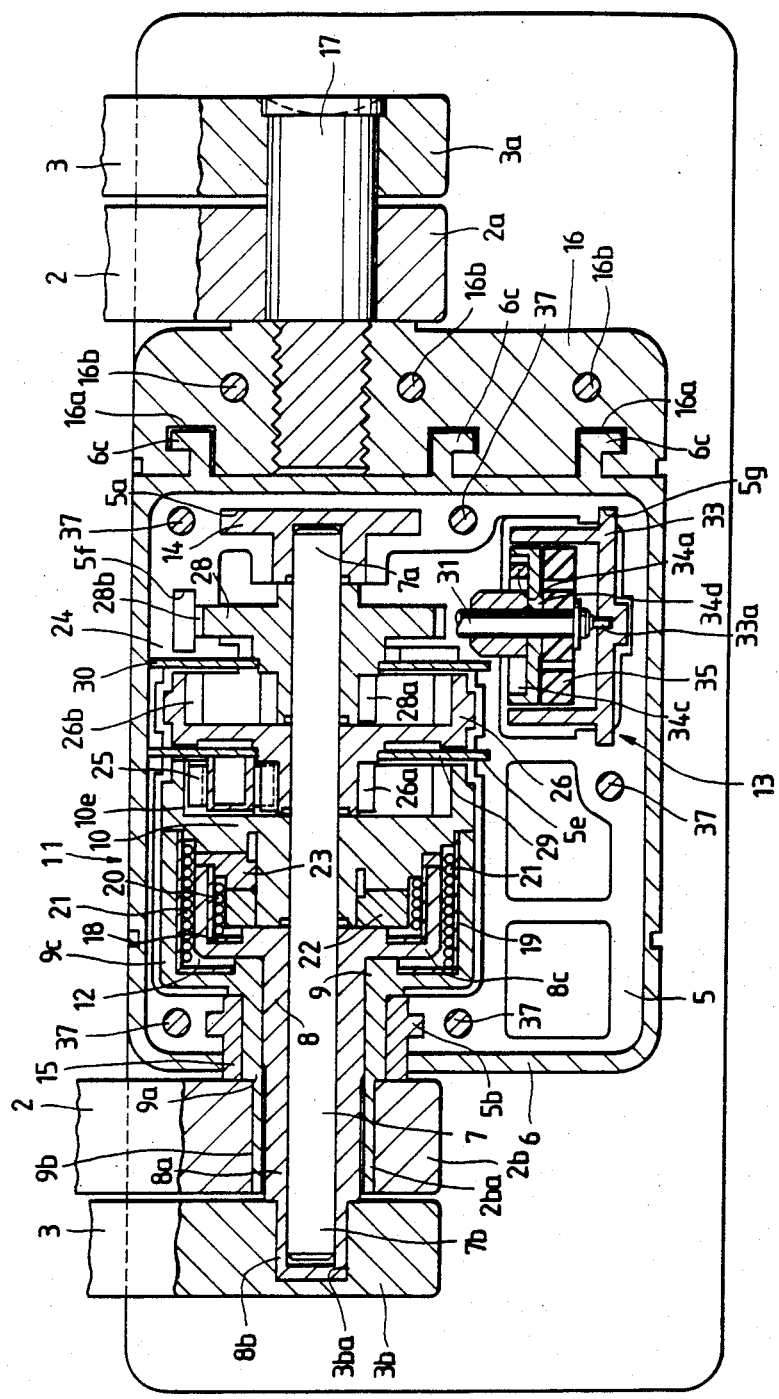
FIG. 4 is a horizontal cross-sectional view of the speed governor.

The construction of the speed governor 4 now will be described with reference to FIGS. 3 and 4. The speed governor includes a housing composed of a casing 5 (see FIGS. 14 to 23) and a cover 6 (see FIGS. 24 to 31) which are connected together in a water-tight manner, a main shaft 7 contained in the housing and serving as a center or axis of rotation a first input shaft 8 rotatably supported on the main shaft 7, a second input shaft 9 rotatable about the first input shaft 8, a driven rotatable member 10 adjacent to the input shafts and rotatably mounted on the main shaft 7, first and second one-way transmission clutches 11 and 12 interposed between the input shaft 8 and the driven rotatable member 10 and between the input shaft g and the driven rotatable member 10, respectively and a brake 13 always connected to the driven rotatable member 10.

One end 7a of the main shaft 7 is supported by a shaft support member 14 which is received in a groove 5a (see FIGS. 14 and 15) of the casing 5 and in a groove 6a (see FIGS. 24, 27 and 30) of the cover 6 and is threadedly connected to the casing. A tubular shaft portion 8a of the first input shaft 8 is rotatably fitted on the other end portion 7b of the main shaft 7, and a tubular shaft portion 9a of the second input shaft 9 is rotatably fitted on the tubular shaft portion 8a. The tubular shaft portion 9a is rotatably supported by a bearing member 15 which is received in a groove 5b (see FIGS. 14 and 15) of the casing and in a groove 6b (see FIGS. 24, 27 and 28) of the cover, and is fixed by screws. The end portion of the tubular shaft portion 8a of the first input shaft extending outwardly from the tubular shaft portion 9a is partly cut-off or removed at its outer peripheral surface, and this cut portion 8b is fitted in an engaging hole 3ba in the hinged portion 31, of the lid 3 such that the cut portion 8b is integrally coupled to the engaging hole 3ba in the direction of rotation.

A cut portion 9b is formed on the outer peripheral surface of the tubular shaft portion 9a of the second input shaft 9, and is fitted in an engaging hole 2ba, formed through the hinge portion 2b of the seat 2, such that the cut portion 9b is coupled integrally to the engaging hole 2ba in the direction of rotation The other hinge portions 2a and 3a of the lid 3 and seat 2 are rotatably supported by a support shaft 17 threaded into a nut block 16. The nut block 16 has engaging grooves 16a which are engaged respectively with hooks 6c (see FIGS. 24 25, 32 and 33) on the side surface of the cover 6 and the nut block 16 is secured to the casing 5 by screws 16b.

The first input shaft 8 has a sleeve 8c of a greater diameter than that of the tubular shaft portion 8a, and the second input shaft 9 has a sleeve 9c of a still greater diameter surrounding the sleeve 8c. Metal reinforcing cups 18 and 19 are fitted respectively in the inner peripheral surfaces of the sleeves 8c and 9c so that each cup is coupled integrally to its mating sleeve in the direction of rotation Coil springs 20 and 21 are held at their outer peripheries in contact with the inner peripheral surfaces of the cups 18 and 19 respectively.

As best shown in FIGS. 11(a)–11(c) to 13 the driven rotatable member 10 has a boss 10b formed about a center hole 10a, serving as a center of rotation through, which the main shaft 7 extends, a retaining groove 10c receiving the proximal end of the coil spring 20, a retaining groove 10d receiving the proximal end of the coil spring 21, a retainer ring 22 retaining the coil spring 20 in the retaining groove 10c, a retainer ring 23 retaining the coil spring 21 in the retaining groove 10d, and inwardly-directed serrations or teeth 10e. One end of each of the coil springs 20 and 21 are fixedly connected to the driven rotatable member 10 by engaging those ends in the retaining grooves 10c and 10d, respectively, then fitting the rings 22 and 23 on the boss 10b and a stepped portion 10f, respectively, and then securing these rings to the driven rotatable member 10 by welding or other suitable attachment method.

The driven rotatable member 10 has spring seats 10g and 10h for receiving the initial portions of the turns of the coil springs which are inclined The ring 23 also has a spring seat 23a. The free ends of the coil springs 20 and 21 are held in contact with the inner peripheral surfaces of the cups 18 and 19, respectively. The direction of turn of the coil springs 20 and 21 is such that when the seat 2 and the lid 3 are rotated in a first direction a (FIG. 2) (i.e., their closing direction), the coil springs transmit the rotational forces of the input shafts 8 and 9 to the driven rotatable member but when the seat 2 and the lid 3 are rotated in a second direction b (FIG. 2) (i.e.. their opening direction) the coil springs do not transmit the rotational forces of the input shafts 8 and 9 to the driven rotatable member 10. Therefore, the sleeve 8c, the driven rotatable member 10 and the coil spring 20 constitute a first one-way transmission clutch 11, and the sleeve 9c, the driven rotatable member 10 and the coil spring 21 constitute a second one-way transmission clutch 12.

A train of speed-increasing wheels 24 are interposed between the driven rotatable member 10 and the brake 13, for increasing the speed of the driven rotatable member 10 and for transmitting this increased speed to the brake 13. The speed-increasing gear train 24 comprises idler gears 25 which always are enmeshed with the teeth 10e of the driven rotatable member 10, a gear 26 of a greater diameter rotatably supported on the main shaft 7 and having a smaller-diameter gear portion 26a enmeshed with the idler gears 25 idler gears 7 enmeshed with an inward gear portion 26b of the gear 26, and a worm gear 28 rotatably supported on the main shaft 7 and having a gear portion 28a enmeshed with the idler gears 27. The worm gear 28 has a gear portion 28b. The idler gears 25 are rotatably supported respectively on three shafts 29a (only one of which is shown) which are secured to a support plate 29 and are spaced at an angle of 120 degrees from one another, the support plate 29 being fixedly received in a groove 5d (see FIGS. 14, 15 and 20) of the casing 5 and in a groove 6d (see FIGS. 24, 27 and 31) of the cover 6.

The idler gears 27 are rotatably supported respectively on two shafts 30a which are secured to a support plate 30 and are spaced at an angle of 180 degrees from each other, the support plate 30 being fixedly received in a groove 5e (see FIGS. 14 and 15) of the casing 5 and in a groove 6e (see FIGS. 24, 27 and 29) of the cover 6. The speed of rotation of the driven rotatable member 10 is increased by the idler gears 25, the gear 26 and the idler gears 27 and is transmitted to the worm gear 28. The worm gear 28 is disposed perpendicularly to the main shaft 7 and is enmeshed with a worm shaft 31 which constitutes part of the brake mechanism 13.

Figure 7:
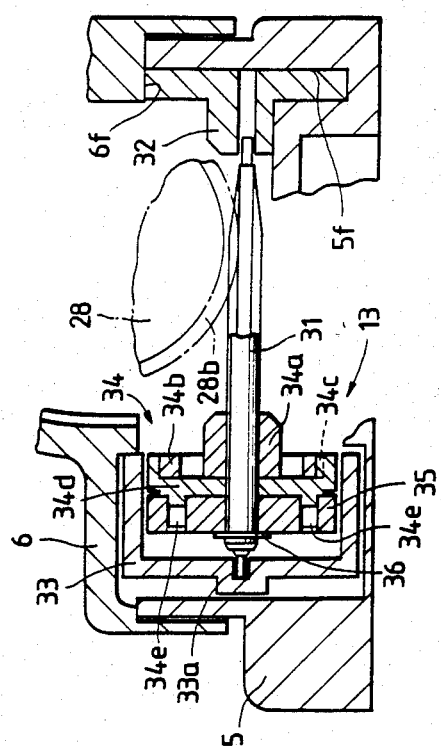
FIG. 7 is a vertical cross-sectional view of one example of a brake.
Figure 6:
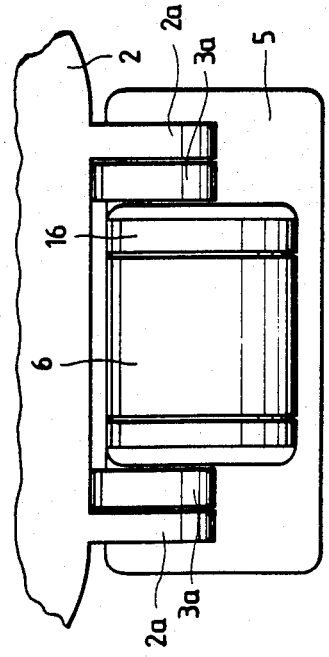
FIG. 6 is a plan view of the speed governor.
Figure 9:
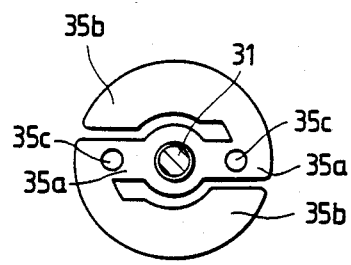
FIG. 9 is a front-elevational view of a friction member of the brake.
Figure 10:
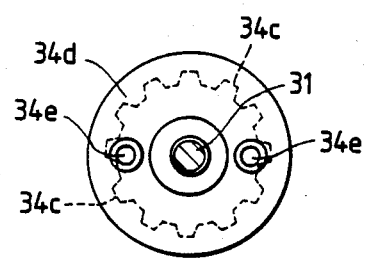
FIG. 10 is a front-elevational view of a friction-receiving member of an overload prevention mechanism.
Figure 11A:
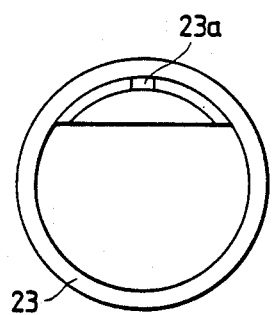
FIGS. 11(a) and 11(c) are side-elevational views of a member constituting part of a one-way transmission clutch.
Figure 11B:
FIG. 11(b) is a cross-sectional view thereof.
Figure 11C:
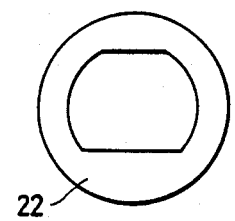
Figure 12:
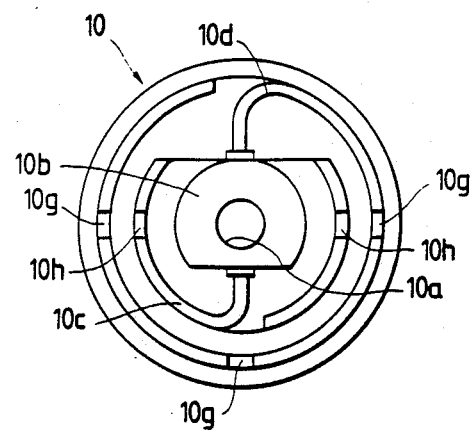
FIG. 12 is a side-elevational view of one example of a driven rotatable member.
Figure 13:
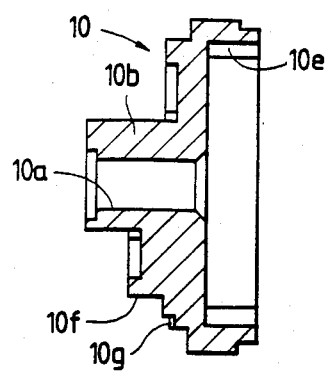
FIG. 13 is a cross-sectional view of the driven rotatable member.
Figure 14:
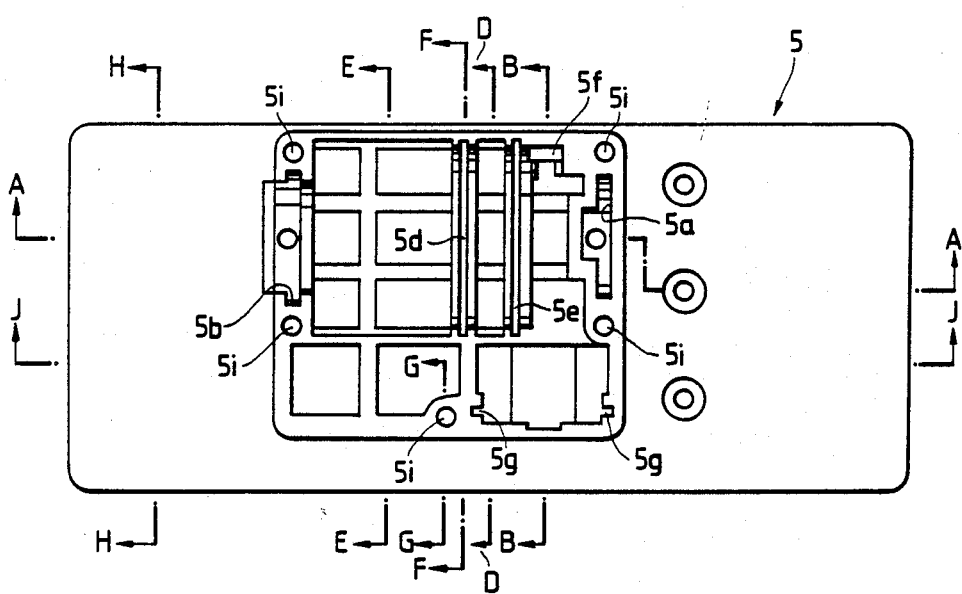
FIG. 14 is a plan view of a casing.
Figure 15:
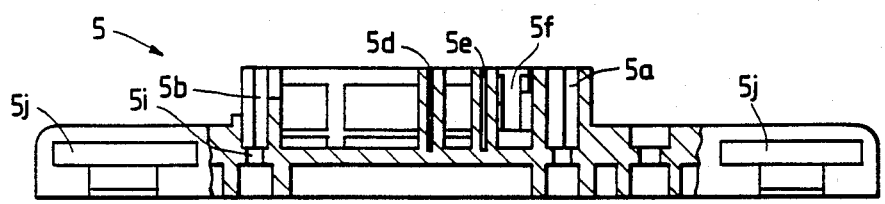
FIG. 15 is a cross-sectional view taken along the line A—A of FIG. 14.
Figure 16:
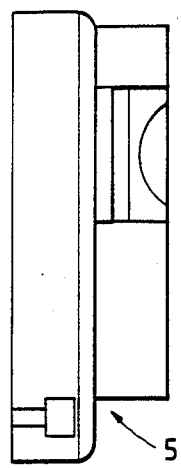
FIG. 16 is a left side-elevational view of the casing of FIG. 14.
Figure 17:
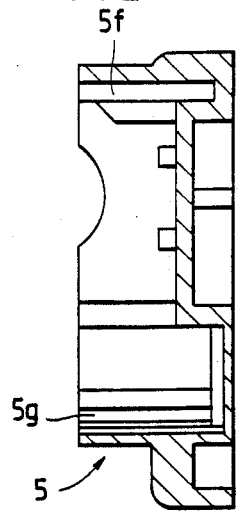
FIG. 17 is a cross-sectional view taken along the line B—B of FIG. 14.
Figure 18:
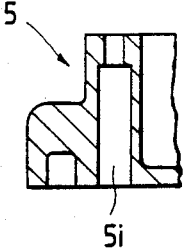
FIG. 18 is a cross-sectional view taken along the line G—G of FIG. 14.
Figure 19:
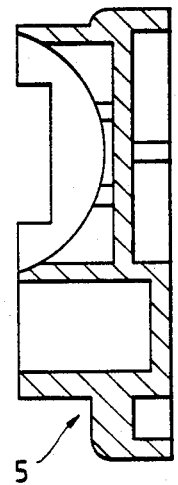
FIG. 19 is a cross-sectional view taken along the line E—E of FIG. 14.
Figure 20:
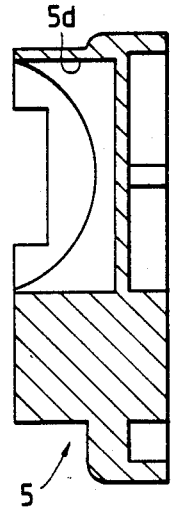
FIG. 20 is a cross-sectional view taken along the line F—F of FIG. 14.
Figure 21:
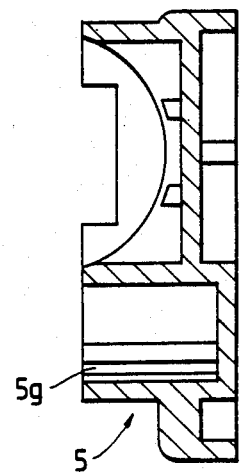
FIG. 21 is a cross-sectional view taken along the line D—D of FIG. 14.
Figure 26:
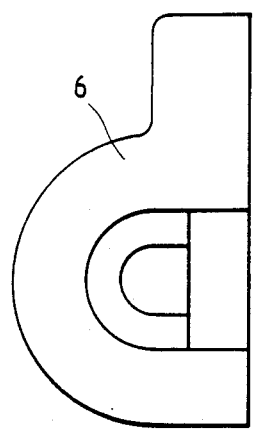
FIG. 26 is a left side-elevational view of the cover of FIG. 24.
Figure 27:
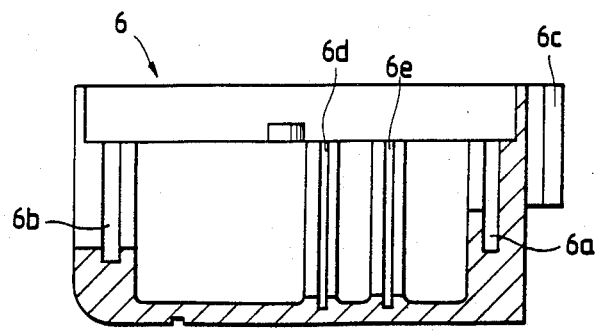
FIG. 27 is a cross-sectional view taken along the line A—A of FIG. 24.
Figure 28:
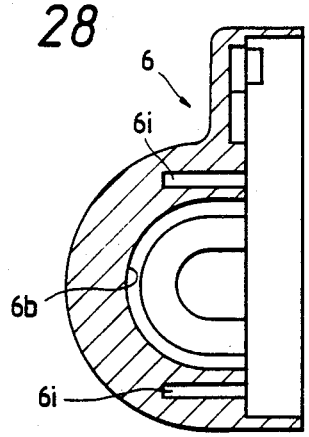
FIG. 28 is a cross-sectional view taken along the line F—F of FIG. 24.
Figure 29:
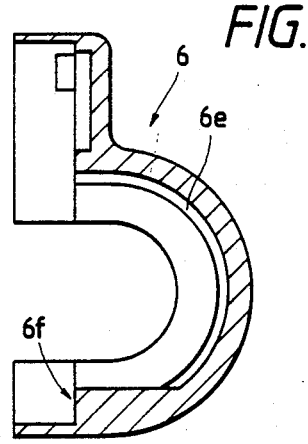
FIG. 29 is a cross-sectional view &taken along the line D—D of FIG. 24.
Figure 30:
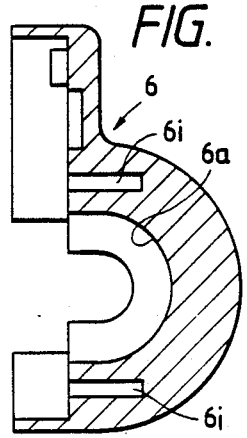
FIG. 30 is a cross-sectional view taken along the line B—B of FIG. 24.
Figure 31:
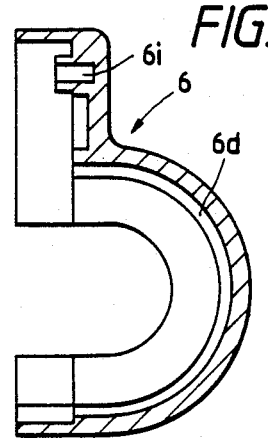
FIG. 31 is a cross-sectional view taken along the line E—E of FIG. 24.
Figure 32:
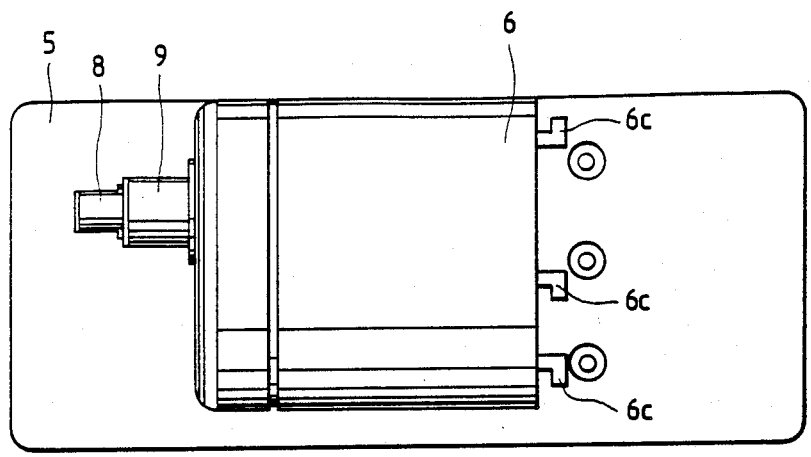
FIG. 32 is a plan view showing the cover and the casing connected together.

As shown in FIG. 7, the brake mechanism 13 includes a worm shaft 31 rotatably supported by a bearing 32 and a bearing hole 33a in a brake cup 33 received a groove 5g (see FIG. 14), the bearing 32 being received in a groove 5f (see FIGS. 14 and 15) of the casing 5. The brake 13 further includes a friction member 35 mounted on the worm shaft 31 through an overload prevention mechanism 34 such that the friction ember 35 is rotatable relative to the worm shaft 31, the worm shaft 31 extending through the friction member 35. The bearing 32 and the cup 33 are retained by retainer portions 6f and 6g see FIG. 24) of the cover 6, respectively. The friction member 35 is made of an elastic material such as rubber, and as shown in FIG. 9, the friction member 35 has arms 35a extending radially from a central portion through which a hole for loosely receiving the worm shaft 31 is formed, and weight portions 35b extending circumferentially from the arms 35a, respectively. Each arm portion 35a has a hole 35c in which a pin described later is engaged.

As shown in FIGS. 7 to 10, the overload prevention mechanism 34 includes a ratchet 34a which is press-fitted on a worm shaft 31, and a friction-receiving member 34d having recesses 34c with which engaging teeth 34b of the ratchet 34a are resiliently engaged. The friction-receiving member 34d is loosely fitted on the worm shaft 31 and at one side has pins 34e which are received respectively in the holes 35c of the friction member 35. Therefore, the friction member 35 and the friction-receiving member 34d are coupled together in the direction of rotation of the worm shaft 31. The ratchet 34a and a ring 36 mounted on the worm shaft 31 prevent the two members 35 and 34d from movement along the axis of the worm shaft 31. As will be described more fully hereinafter, when the worm shaft 31 rotates at a high speed, the weight portions 35b are moved outwardly, or opened, under the influence of a centrifugal force so that they are brought into frictional contact with the inner peripheral surface of the cup 33 to brake the rotation of the worm shaft 31.

The steps of assembling the above embodiment now will be briefly described. First, as shown in FIG. 7, the brake mechanism 13 is mounted by fitting the bearing member 32 and the cup 33 in their mating grooves of the casing 5, respectively. Then, as shown in FIGS. 3 and 4 the bearing members 14 and 15 are mounted on a sub-assembly comprising the first input shaft 8, the second input shaft 9, the driven rotatable member 10 and the speed-increasing gear train 24 all of which are rotatable about the main shaft 7. Then, the sub-assembly is set in position relative to the casing 5, with the worm gear 28 meshingly engaged with the worm shaft 31 and the bearing members 14 and 15 are fixed by screws. Then, the cover 6 is placed on the casing 5 and is fastened thereto by fastening screws (not shown) passing through holes 5i (see FIG. 14) of the casing 5 and threaded into tapped holes 6i (see FIG. 24) of the cover 6.

Figure 5:
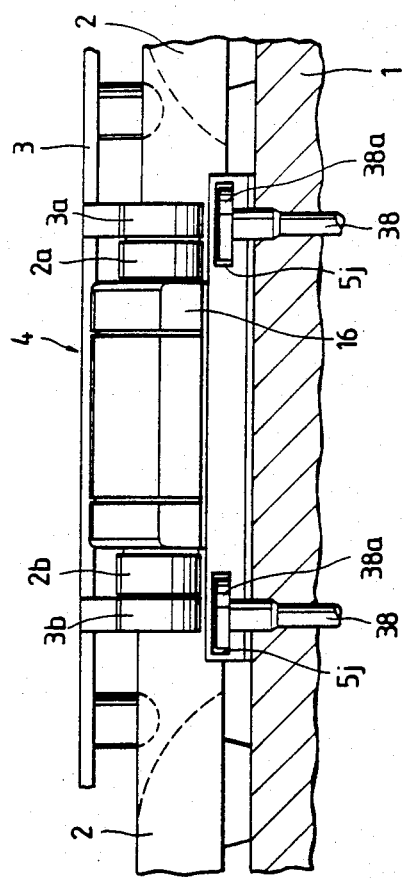
FIG. 5 is a rear view of the speed governor.
Figure 33:
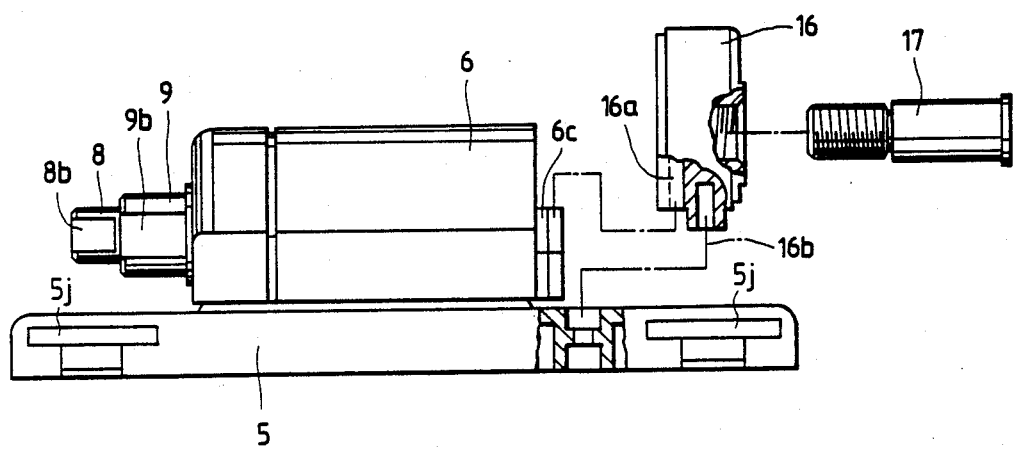
FIG. 33 is a rear view, showing the order of the assembly.
Figure 34:
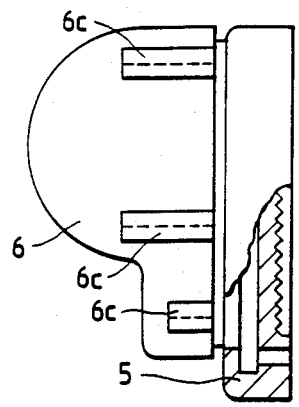
FIG. 34 is a right side-elevational view of FIG. 32.
Figure 35:
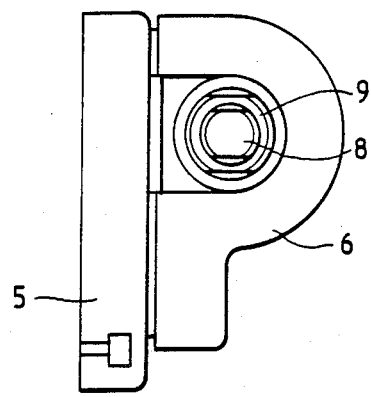
FIG. 35 is a left side-elevational view of FIG. 32.

Then, as shown in FIG. 33, the nut block 16 is engaged with the cover 6 and is fastened to the casing 5 by a fastening screw 16b. Then the end of the second input shaft 9 is inserted in the hole 2ba of the hinge portion 2b of the seat 2, and then the end of the first input shaft 8 is inserted in the hole 3ba of the hinge portion 3b of the lid 3. The screw 17 is passed through the other hinge portions 2a and 3a of the seat 2 and lid 3 and is threaded into the nut block 16 (see FIGS. 3. 4 and 6). Then as shown in FIG. 5 mounting grooves 5j (see FIG. 22), formed in the casing 5 and extending from its rear portion to its front, are engaged respectively with locating screws 38 (each having a flange 38a) fixedly secured to the upper surface of the toilet bowl 1. The mounting of the seat 2 and lid 3 may be carried out after the speed goVernor 4 is mounted on the body 1.

The operation of this embodiment now will be described.

In FIG. 2, it is assumed that the seat 2 is lowered, as indicated by the solid line, with the lid 3 being open, as indicated by the dash-and-dot line 3A. When the lid 3 is pivotably moved in the first (closing) direction indicated by the arrow the first input shaft 8 connected to the lid 3 is rotated in the same direction. Upon rotation of the first input shaft 8 in the first direction a, the cup 18 associated therewith frictionally engages the coil spring 20 of the first one-way clutch 11 in a direction so as to increase the diameter of the coil spring 20, so that the spring 20 is substantially integrally coupled to the cup lB (and hence to the first input shaft 8) to drive or rotate the driven rotatable member 10 to which the proximal end of the spring 20 is secured The rotational force of the driven rotatable member 10 drives the worm shaft 31 for rotation at a high speed through the speed-increasing gear train 24. Upon rotation of the worm shaft 31 the weight portions 35b (see FIG. 9) of the friction member 35 are moved outwardly under the influence of a centrifugal force through the overload prevention mechanism 34, so that the weight portions 35b are brought into frictional contact with the inner peripheral surface of the braking cup 33 to brake the rotation of the worm shaft 31.

The braking force applied to the worm shaft 31 serves as a braking force for the speed-increasing gear train 24 (which drives the worm shaft 31 for rotation) and the first input shaft 8 to brake the rotation of the lid 3 connected to this input shaft. Therefore, the lid 3 pivotably moving in its closing direction, is gently and gradually moved at a predetermined speed to its closed position under the influence of the braking force applied thereto A similar operation is effected when the seat 2 indicated by the dash-and-dot line 2A (FIG. 2) is pivotably moved in its closing direction indicated by the arrow. In that case, the second one-way clutch 12 is operated, so that the coil spring 21 couples the second input shaft 9 and the driven rotatable member 10 together.

Next, the opening of the seat 2 from its closed position indicated by the solid line in FIG. 2 will be described. When the seat 2 is pivotably moved in its opening direction, that is, in the second direction b the second input shaft 9 connected to the seat 2 is rotated in the same direction. In response to the rotation of the second input shaft 9, the cup 19 is frictionally and slidingly engaged with the coil spring 21 but this rotating is in a direction so as to wind up or tighten the coil spring (i.e., to reduce the diameter of the coil spring). so that this rotation will not cause the driven rotatable member 10 to rotate. Therefore, the load under which the closed seat 2 is pivotably moved in the second direction is the mass of the pivotable member, and the opening operation is lightly carried out. When the lid 3 indicated by the solid lines in FIG. 2 is pivotably moved in the second direction b the coil spring 20 is wound up, and therefore the clutch is disengaged to interrupt the transmission of rotation between the driven rotatable member 10 and the first input shaft 8.

Also, when the seat and the lid, disposed in their respective positions indicated by the dash-and-dot lines 2A and 3A in FIG. 2, are pivotably moved together in the first direction a, either of the first and second transmission clutches 11 and 12 are operated to rotate the driven rotatable member to operate the brake mechanism 13. As a result the speed of pivotable movement of the seat and the lid is controlled so that they are closed slowly. In this case, the speed at which the seat and the lid are closed in unison is hardly different from the closing speed at which they are closed separately. The reason is that the brake of the type in which the frictional member frictionally engages the brake cup produces a predetermined braking force irrespective of the mass of the pivotable members.

Figure 8:
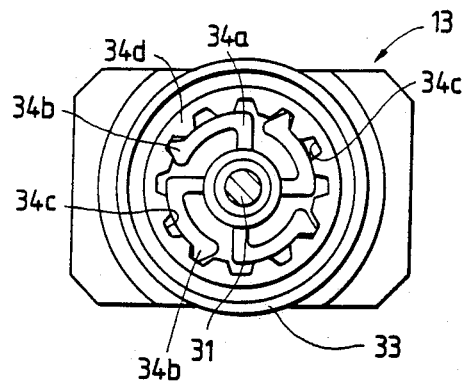
FIG. 8 is a front-elevational view of the brake.

Next, the situation will be explained in which, for example, the seat 2 in its open position indicated by the dash-and-dot line 2A in FIG. 2 is forcibly moved pivotably in the first direction a when the pivotable movement of the seat due to its own weight is felt to be undesirably slow. When the seat 2 is forcibly moved pivotably in the first direction a, the second input shaft 9 is rotated in the same direction, and the diameter of the coil spring 21 of the second one-way transmission clutch 12 is increased, so that the driven rotatable member 10 and the input shaft 9 are coupled together, thereby rotating the worm shaft 31 at a high speed through the speed-increasing gear train 24. Upon rotation of the worm shaft 31, the friction member 35 is rotated through the friction-receiving member 34d with which the ratchet 34a fixedly mounted on the worm shaft 31 is engaged. As a result, the weight portions 35b are moved outwardly under the influence of a centrifugal force and are brought into frictional contact with the inner peripheral surface of the cup 33 to apply the braking action. In this case, normally, this braking force brakes the pivotable movement of the seat 2, but since the seat is being forcibly moved pivotably, an overload is applied to the worm shaft 31. At this time the ratchet 34a rotating in a clockwise direction in FIG. 8 is flexed so that the engagement between its engaging teeth 34b and the recesses 34c of the friction-receiving member 34d is released so as to avoid the above overload. One of the seat 2 and the lid 3 may be connected to either of the first and second input shafts 8 and 9 while the other is connected to the remaining input shaft. However, considering the transmitting force of the clutches, it is preferred that the pivotable member of a greater mass (i.e., the seat 2 in the illustrated embodiment) be connected to the outer shaft of the double shaft construction (i.e. the second input shaft 9).

Figure 36:
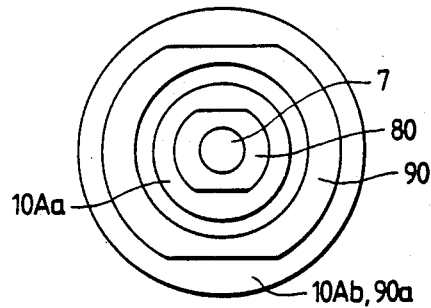
FIG. 36 is a fragmentary cross-sectional view of another example of a one-way transmission clutch.
Figure 37:
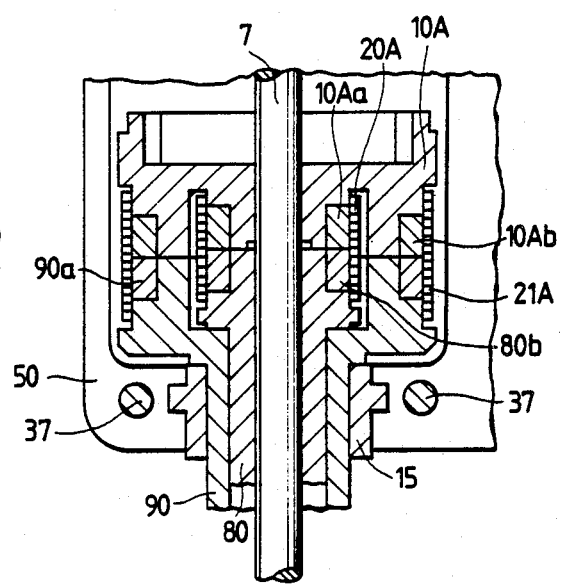
FIG. 37 is a horizontal cross-sectional view of the clutch of FIG. 36.

Another example of the one-way transmission clutch now will be described with reference to FIGS. 36 and 37. First and second input shafts 80 and 90 of a double shaft arrangement are rotatably supported on the main shaft 7. The input shafts 80 and 90 have tubular portions on their respective ends, on which respective retainer rings 80b and 90b are fitted. A driven rotatable member 10A has a double-tube arrangement at its one side opposed to the ends of the input shafts, and retainer rings 10Aa and 10Ab are fitted respectively on the inner and outer tubular portions of the double-tube arrangement of the driven rotatable member. The inner and outer tubular portions of the driven rotatable member 10 are equal in diameter to their respective mating tubular portions of the first and second input shafts 80 and 90, and coil springs 20A and 21A are wound respectively around the two pairs of mating tubular portions.

When each input shaft is rotated in the first direction, the coil spring is wound up or tightened transmitting the rotation of the input shaft to the driven rotatable member. When the input shaft is rotated in the second direction, the coil spring is loosened and does not transmit the rotation of the input shaft to the driven rotatable member. The one-way transmission clutches are not limited to the illustrated spring clutches and may be replaced by one-way rotation-transmitting mechanisms of other types In the above embodiment, although the nut block 16 supporting the one hinge portions of the pivotable members is provided as a separate member, it may be formed integrally with the casing 5 or the cover 6 The brake mechanism 13 is not limited to the illustrated friction brake type, and may be replaced by an oil brake or other suitable types Further the clutches may be connected directly to the brake mechanism without the use of the speed-increasing gear train therebetween.

Although the illustrated embodiments have shown a toilet having a toilet lid and a toilet seat the invention is applicable to other articles having two pivotable members, such as a box or furniture.

A second embodiment of the invention will now be described with reference to FIGS. 38 to 49, the invention here embodying a speed governor for a toilet seat and a toilet lid both pivotably connected to a toilet body.

Figure 38:
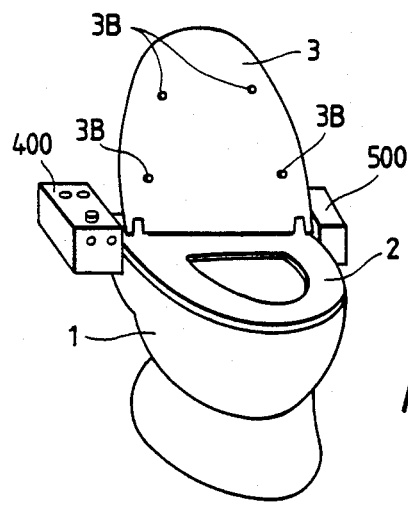
FIG. 38 is a perspective view of a toilet incorporating a speed governor according to a second embodiment of the present invention.

In FIG. 38, the toilet seat 2 and the toilet lid 3 are pivotably connected at their proximal ends to a rear end of an upper surface of the toilet body 1. The toilet here shown has a shower. A shaft mounted on a operating box 400 supports one end of the axis or center of rotation (for pivotable movement) of the toilet seat 2 and toilet lid 3 while a shaft (later described) mounted on a speed governor 500 supports the other end of the axis of rotation To install the speed governor 500, mounting portions 600a and 600a, formed respectively on the opposite sides of a casing 600, are placed on the upper surface of the toilet body 1, and then are fastened thereto by fastening screws 700 see FIG. 42).

Figure 39:
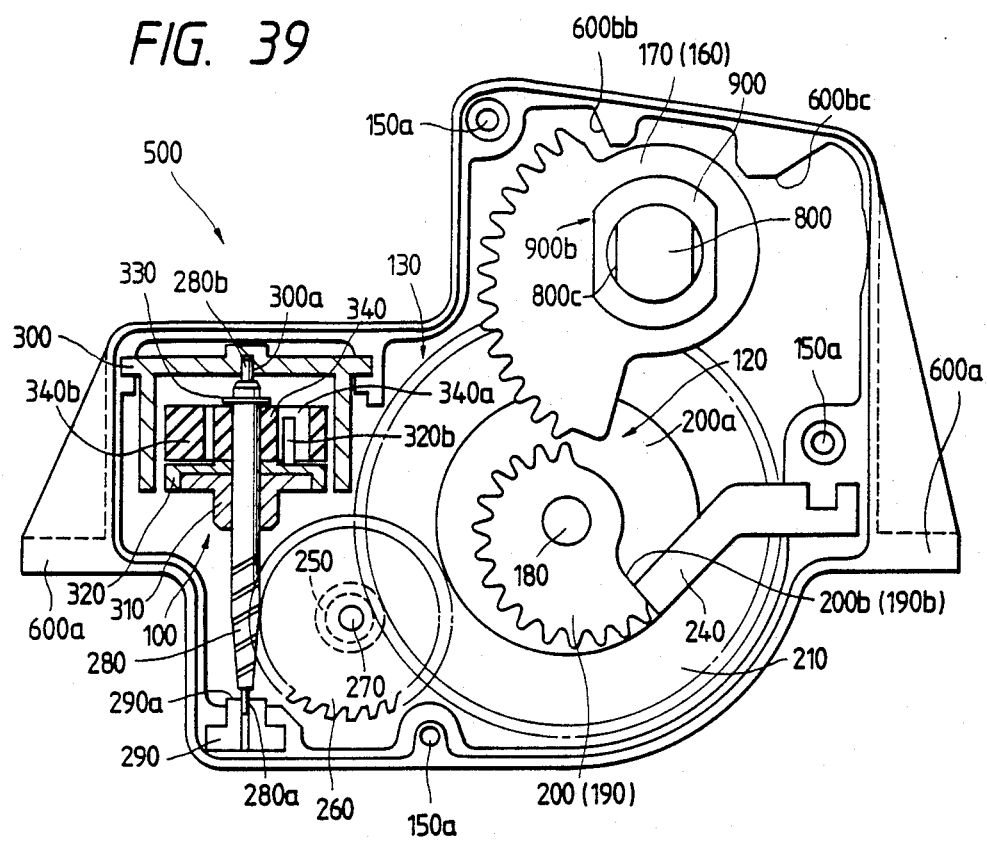
FIG. 39 is a partially cross-sectional, side-elevational view of the speed governor of FIG. 38.
Figure 40:
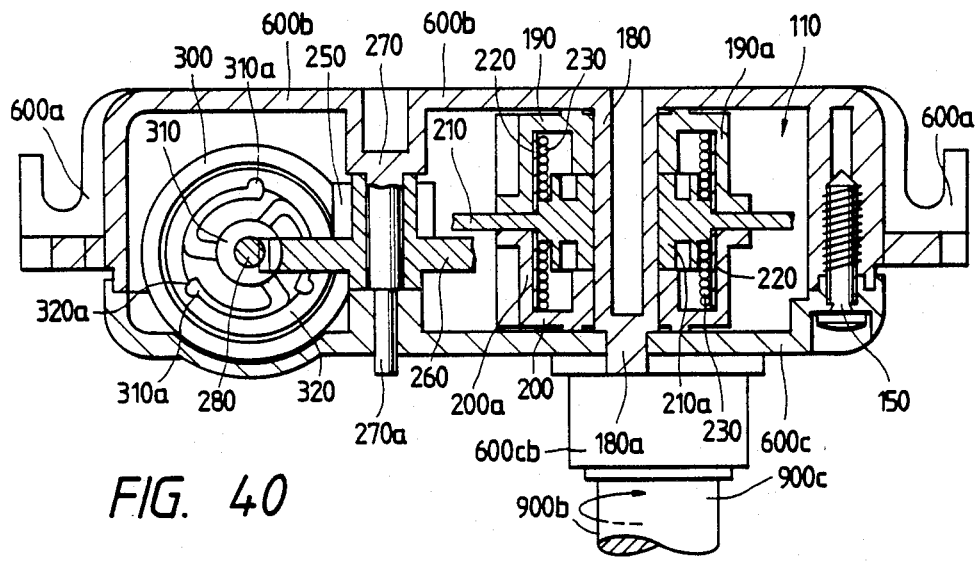
FIG. 40 is a horizontal cross-sectional view of the speed governor of FIG. 38.
Figures 41, 42:
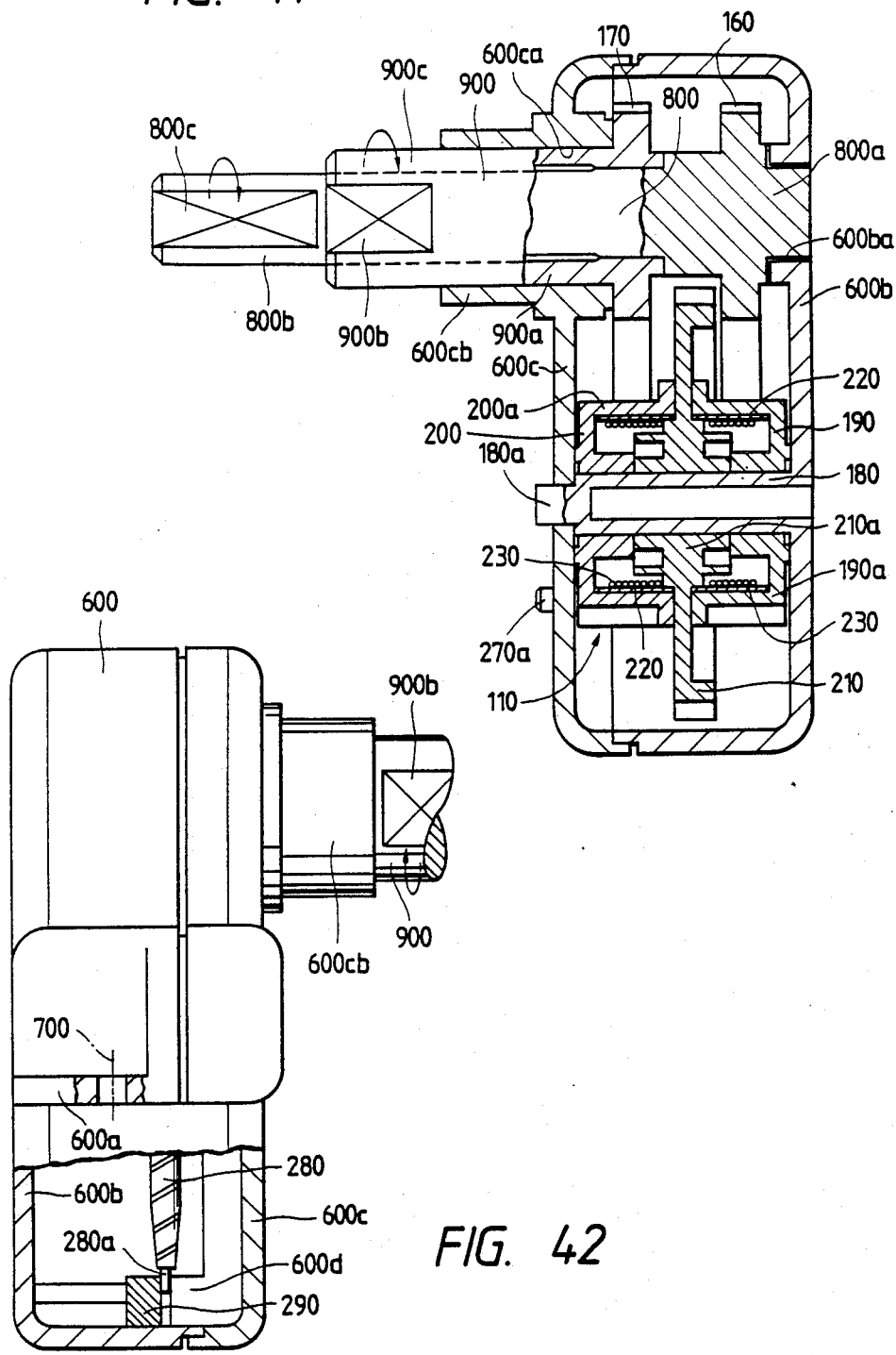
FIG. 41 is a vertical cross-sectional, front-elevational view of the speed governor of FIG. 38.
FIG. 42 is a partly sectional, rear view of the speed governor of FIG. 38.

In FIGS. 39 to 46, the speed governor 500 includes the casing 600, input shafts BOO and 900 partly extending outwardly from the casing 600 a brake 100 accommodated within the casing 600, a one-way transmission clutch 110 a brake release 120, and rotation transmitting structure 130. In the illustrated embodiment, the speeds of the toilet seat 2 and the toilet lid 3 serving as the pivotably members are regulated, and therefore the two input shafts 800 and 900 used are rotatable or pivotably movable about a common axis. The casing 600 includes a casing body 600b and a casing lid 600c fitted on the casing body and fastened thereto by tapping screws 150. In FIG. 39, reference numeral 150a denotes screw holes formed in the casing body.

A tubular shaft portion 900a of the input shaft 900 is extended through a bearing hole 600a (see FIG. 41) of the casing lid 600c. The input shaft 800 is extended through the tubular shaft portion 900a, and the proximal end 800a of the input shaft 800 is received in a bearing hole 600a in the casing body. The input shaft 900 projects outwardly from a cylindrical portion 600cb of the casing lid, and a cut portion 900b for preventing the rotation is formed in the outer peripheral surface of the projecting portion 900c of the input shaft 900. The projecting portion 900c is fitted in an engaging hole 3A formed through the toilet lid 3, the engaging hole 3A being complementary in cross-section to the projecting portion 900c so that the projecting portion 900c is substantially integrally coupled to the engaging hole 3A in the direction of rotation (see FIGS. 45 and 46). One end of the input shaft 800 projects further beyond the projecting portion 900c of the input shaft 900, and a cut portion 800c for preventing rotation is formed in the projecting portion 800b. The projecting portion 800b is fitted in an engaging hole 2A formed through the toilet seat 2, the engaging hole 2A being complementary in cross-section to the projecting portion 800b so that the projecting portion 800b is substantially integrally coupled to the engaging hole 2A in the direction of rotation (see FIGS. 45 and 46).

First gears 160 and 170, which are spaced from each other, are formed integrally respectively on those portions of the input shafts 800 and 900 disposed within the casing 600. The first gears 160 and 170 may be formed separately from the respective input shafts, and may be integrally connected to them. Each of the first gears 160 and 170 includes a partially-involute gear whose pitch gradually increases when the gear 160 (170) is moved angularly in a clockwise direction (FIG. 39). As shown in FIG. 39, the case body 600b has a stopper portion 600bb for preventing the overrunning of the first gears 160 and 170 when these gears are angularly moved in a first direction (i.e., in a clockwise direction in FIG. 39). A second gear 190 in mesh with the first gear 160 and a second gear 200 in mesh with the first gear 170 are rotatably mounted on a support shaft 180, formed on the casing body 600b, in spaced relation to each other. The distal end 180a of the support shaft 180 is fitted in a hole in the casing lid 600c. A third gear 210 of a greater diameter is rotatably supported on the support shaft 180 and interposed between the second gears 190 and 200. Each of the second gears 190 and 200 comprises a partially-involute gear which is smaller in diameter than the first gear.

Figure 48:
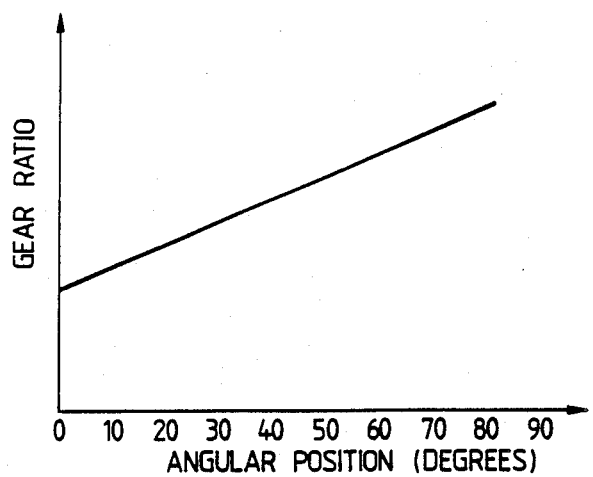
FIG. 48 is a graph showing a change in gear ratio of a gear train as a function of angle in the embodiment shown in FIG. 39.

The first gears 160 and 170 are disengaged from the second gears 190 and 200 respectively at a final stage of the pivotable or angular movement of the toilet seat 2 and the toilet lid 3 (i.e.. the position spaced about 80 degrees from the vertical position) where the toilet seat 2 and the toilet lid 3 are about to be brought into a horizontal position thereby releasing the transmission of the rotation of the input shafts 800 and 900 to the brake 100. Thus, these first and second gears constitute the brake release mechanism 120. The gear ratio of the first gear 160, 170 to the second gear 190, 200 in accordance with the angular position (the angle of opening from the vertical position) of the toilet seat 2 or the toilet lid 3 is shown in FIG. 48. From this Figure, it can be seen that the gear ratio increases as the toilet seat 2 or the toilet lid 3 approaches the horizontal position, and the first and second gears are disengaged from each other at the final stage of pivotable movement (from about 80 to 90 degrees).

Figure 46:
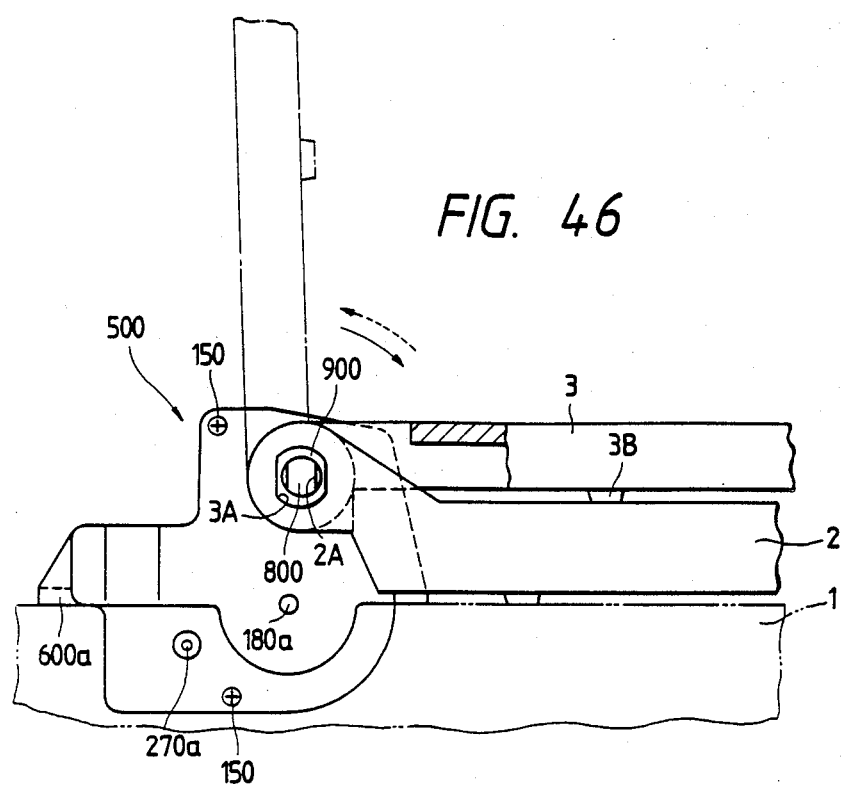
FIG. 46 is a side-elevational view showing the angular positions of the pivotable members.

Rings 220 and 220 are fitted respectively in tubular portions 190a and 200a of the second gears 190 and 200, and coil springs 230 and 230 are held in contact with respective inner peripheral surfaces of these rings, each of the coil springs 230 and 230 being capable of increasing its diameter One end of each of the coil springs 230 and 230 is fixed to respective portions of a boss 210a of the third gear 210 while the free ends of those springs are held in contact with respective inner peripheral surfaces of the rings together with their bodies When the toilet seat 2 and the toilet lid 3 (and hence the respective input shafts 800 and 900 coupled substantially integrally to them) are angularly moved in the first direction indicated by a solid line in FIG. 46, the coil springs 230 and 230 transmit the rotations of the second gears 190 and 200 to the third gear 210, respectively.

When the toilet seat and the toilet lid are pivotably moved in the second direction indicated by a broken line in FIG. 46, the second gears 190 and 200 are rotated in a direction so as to wind up or tighten the coil springs 230 and 230, so that the rotational forces of the input shafts are not transmitted to the third gear 210. In this manner, the second gears 190 and 200, the coil springs 230 and 230, and the third gear 210 constitute the one-way transmission clutch 110. As shown in FIG. 39, one side 200b (190b) of the second gears 200 (190) is abuttable respectively against stoppers 240 (only one of which is shown) which limit the rotations of these gears The stoppers 240 may be formed either integrally with the casing lid 600c or as separate members such as pins secured to the casing.

The third gear 210 of a greater diameter is always enmeshed with a fourth pinion 250 of a smaller diameter The fourth pinion 250 is formed integrally with a worm wheel 260 serving as a fourth gear, and is rotatably supported on a support shaft 270 formed on the casing body 600b. A distal end 270a of the support shaft 270 is fitted in a hole formed in the casing lid 600c. The worm wheel 260 is always in mesh with a worm 280. The worm 280 constitutes part of the brake mechanism 100. The rotations of the input shafts 800 and 900 are increased and are transmitted to the worm 280 through the rotation transmitting mechanism 130 constituted by the first gears 160 and 170, the second gears 190 and 200, the third gear 210, the fourth pinion 250, the worm wheel 260, and the worm 280. The rotation transmitting mechanism 130 includes the speed-increasing gear train and increases the rotation of the input shafts and transmits such increased rotation to the worm 280, thereby driving the worm for rotation at a high speed.

One end 280a of the worm 280 is supported by a bearing block 290 mounted on the casing body 600b while the other end 280b is received in a bearing hole 300a formed through brake a cup 300 mounted on the casing body. Thus, the worm 380 is rotatably supported. The bearing block 290 has a groove in which the one end 280a is received, and a holder portion 600d (see FIG. 42) formed on the casing lid 600c is received in this groove to support the end of the worm. A ratchet 310 capable of expanding is press-fitted on the worm 280, and arms 310a of the ratchet are resiliently engaged at their distal ends in respective engaging recesses 320a formed in one end face of a friction-receiving member 320. The friction-receiving member 320 is loosely fitted on the worm 280. The ratchet 310 and the friction-receiving member 320 constitute a torque limiter, whose operation will be described later A retainer ring 330 is mounted on the worm 280, and a friction member 340, made of rubber or a rubber-like material, is loosely mounted on the worm 280 and is interposed between the retainer ring 330 and the friction-receiving member 320.

As shown in FIGS. 39 and 43, the friction member 340 has arms 340a extending from its boss in three directions, and weight portions 340b extending respectively from the arms 340a along the inner peripheral surface of the cup 300. Pins 320b extending axially from the friction-receiving member 320 are engaged with the arms 340a respectively. Therefore, the friction-receiving member 320 and the friction member 340 are coupled together by the pins 320 in the direction of rotation.

The weight portions 340b of the friction member 340 are disposed close to the inner peripheral surface of the brake cup 300. When the worm 280 rotates at a high speed, the weight portions 340b of the friction member 340 are brought into frictional contact with the inner peripheral surface of the cup 300 under the influence of centrifugal force to brake the rotation of the worm. The braking of the worm 280 brakes the gear train which is driving the w©rm for rotation, and hence brakes the input shafts 800 and 900. The worm 280, the friction member 340, and the brake cup 300 constitute the brake mechanism 100.

Figure 47:
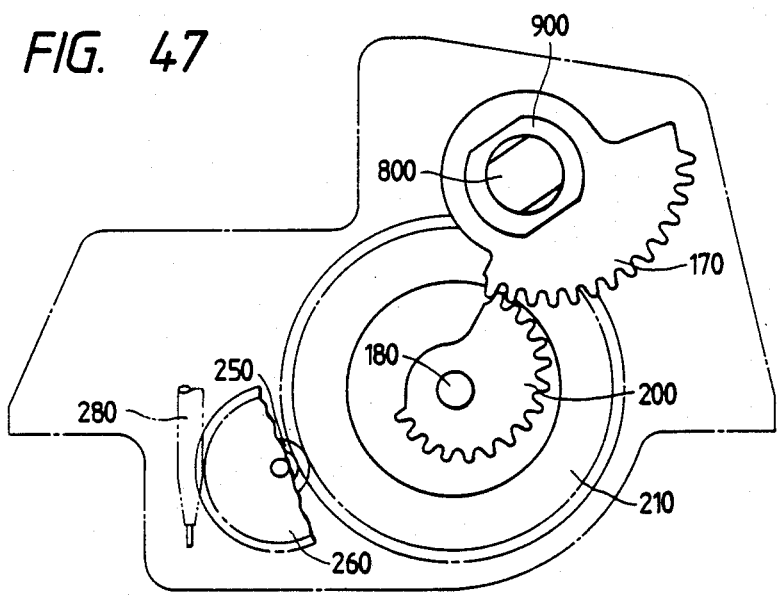
FIG. 47 is a side-elevational view showing the position of the input shaft relative to members associated therewith when the pivotable members are in a vertical position.
Figure 49:
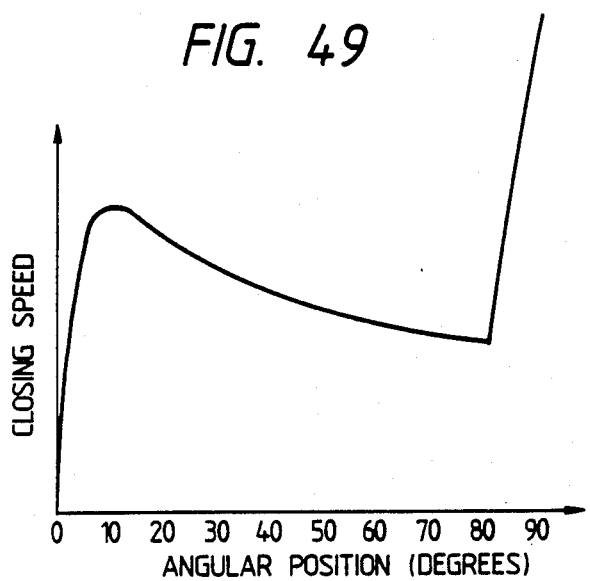
FIG. 49 is a graph showing a change in speed of pivotable movement of members as a function of angle.

FIG. 49 shows the relation between the closing speed and the angular position when the toilet seat of lid is pivotably moved from the vertical to the horizontal position From zero to about 10 degrees from vertical, the brake 100 is not effective, and therefore closing speed increases abruptly in this range. However for angles greater than 10 degrees, up to about 80 degrees (which would be one example of a final stage of pivotable movement), the brake is increasingly effective as the gear ratio increases, so that closing speed gradually decreases. Further from 80 degrees to 90 degrees (closed position), the first gears 160 and 170 become disengaged from the second gears 190 and 200, respectively, thereby releasing the brake and increasing the speed of closing. However since the seat lid does or not have far to fall, there is no great impact The operation of the just-described embodiment now will be described with respect to the pivotable movement of the lid 3 from its vertical (open) position indicated by the dash-and-dot line in FIG. 46 to its horizontal (closed) position indicated by the solid line. When the lid 3 is vertical the first and second gears 170 and 200 mesh with each other as shown in FIG. 47. When the lid 3, at the position indicated by the dash-and-dot line in FIG. 46, is moved pivotably in the first direction indicated by a solid-line arrow, the input shaft 900 is rotated in a clockwise direction (FIG. 47). and the first gear 170 which is integrally coupled to this input shaft is rotated in the same direction, so that the second gear 200, in mesh with this first gear, is rotated in a counterclockwise direction. When the second gear 200 rotates in a first direction, the coil spring 230 of the one-way transmission clutch 110 increases in diameter, drivingly coupling the second gear 200 and the third gear 210 together. As a result, the third gear 210 drives the fourth gear 250 and the worm wheel 260, causing increased rotational speed The worm wheel 260 rotates the worm 280 at a yet further increased speed.

As the angle of the closing of the toilet lid 3 gradually increases, the gear ratio of the first gear 170 to the second gear 200 gradually increases, as shown in FIG. 48, and the speed of rotation transmission effected by the rotation transmitting mechanism 130 is correspondingly increased. When the worm 280 rotates at a high speed, the weight portions 340b of the friction member 340 rotated through the torque limiter are subjected to a centrifugal force and are moved radially outwardly in a centrifugal direction so that the weight portions are brought into frictional contact with the inner peripheral surface of the cup 300 to brake the rotation of the worm. The braking force acting on the worm 280 is transmitted to the input shaft 900 through the rotation transmitting mechanism 130 to brake the input shaft 900 and hence reduce the closing speed of the toilet lid 3.

The speed of rotation of the worm 280 gradually increases as the gear ratio varies in response to a change in angular position of the input shaft 900, and therefore the braking force produced by the friction member 340 and the cup 300 also increases gradually. Therefore, as shown in FIG. 49, at the angular position of zero to about 10 degrees from the start of the closing movement, the closing speed of the lid 3 abruptly increases because the gear train is not yet fully operated but thereafter the closing speed becomes moderate since a sufficient braking force begins to be produced. When the toilet lid 3 approaches the final stage of the pivotable movement (i.e. the angular position of about 80 degrees) immediately before the fully closed position of the lid 3, the one side 200b of the second gear 200 is brought into abutting engagement with the stopper 240 so that the rotation of the second gear is prevented and the brake release mechanism 120 constituted by the first and second gears 170 and 200 releases the meshing engagement between these two gears, so that the braking force ceases to act on the input shaft 900. As a result, the lid 3, which is substantially integrally coupled to the input shaft 900, moves pivotably at a high speed through the remaining 10 degrees or so without being subjected to a braking force, and is brought into the horizontal position that is, the toilet lid 3 is abutted against the seat 2 and thus is stopped. When the lid 3 moves through the remaining 10 degrees without undergoing a braking force, the lid 3 descends into the horizontal position without a great impact since the distance to be covered is short. In this horizontal position, cushions 3b (see FIG. 38) on the lid 3 are held against the toilet seat 2 and the seat 2 is held against the upper surface of the toilet bowl 1.

When the lid 3 which is being pivotably moved by its own weight in the closing direction is forcibly moved pivotably, the input shaft 900 forcibly drives the gear train of the rotation transmitting mechanism 130 for rotation As a result, the worm 280 is rotated at a high speed so that a braking force is applied by the friction member 340 to the worm, but when the friction between the friction member and the cup 300 exceeds a predetermined value, the arms 310a of the ratchet 310 are flexed and thus become disengaged from the engaging recesses 320a of the friction-receiving member 320 thereby allowing the rotation of the worm 280 By so doing, an overload is prevented from acting on the rotation transmitting mechanism 130 including the worm 280. Therefore, the lid 3 can be rotated without receiving a braking force from the brake mechanism 100. In this case, however, the meshing relation between the first gear 170 and the second gear 200 is not changed, and therefore logarithmic gears can be used as the first and second gears 170 and 200.

Next, the pivotable movement of the lid 3 from the horizontal position (closed position) indicated by the solid line (FIG. 46) to the vertical position (open position) indicated by the dash-and-dot line will be described. In this horizontal position, the first and second gears 170 and 200 are disengaged from each other as shown in FIG. 39. When the lid 3 is pivotably moved in the direction of a broken-line arrow (FIG. 46), the input shaft 900 is moved angularly in a counterclockwise direction (FIG. 39). At an initial stage of the rotation of the input shaft, the first and second gears 170 and 200 are not enmeshed with each other but upon movement of the shaft through an angle of about 10 degrees, the two gears are brought into meshing engagement with each other so as to move the gear train of the rotation transmitting mechanism 130 angularly. However, the second gear 200 angularly moving in the second direction (clockwise direction) acts on the coil spring 230 (see FIG. 40) of the one-way transmission clutch 110 in such a maner in as to wind up or tighten this coil spring, so that the coil spring cannot rotate the third gear 210.

Therefore, since the brake mechanism 100 does not apply a braking force to the rotation of the input shaft 900, the lid 3 moving in its opening direction can be opened with a light force. Incidentally, when the lid begins to be opened the coil spring 230 rotates the third gear 210, but this rotation is immediately prevented. More specifically, the worm 280 which is enmeshed with the worm sheet 260 which is rotated by a third gear 210 and the fourth pinion 250 is moved downwardly (FIG. 39) and is pressed at its lower end against the end 290a of the bearing block 290, so that the rotation of the worm wheel 260 is prevented thereby preventing the rotation of the third gear 210. When the rotation of the third gear 210 is prevented, the coil spring 230 and the second gear 200 slip relative to each other, and therefore the transmission of rotation between the input shaft 900 and the brake mechanism 100 is released.

When the lid 3 is pivotably moved to the vertical position, the first and second gears are disposed as shown in FIG. 47. At this time when the lid 3 is pivotably moved excessively, the one side of the first gear 170 is abutted against a stopper 600c (see FIG. 39).

The foregoing describes the opening and closing operation of the lid 3. The opening and closing operation of the seat 2 is the same as that of the lid 3. In this case the input shaft 800 and the first gear 160 are rotated and the gear train operatively connected thereto and including the second gear 160 is rotated. Also, the seat and the lid are pivotably moved in unison in the same manner.

Figure 50:
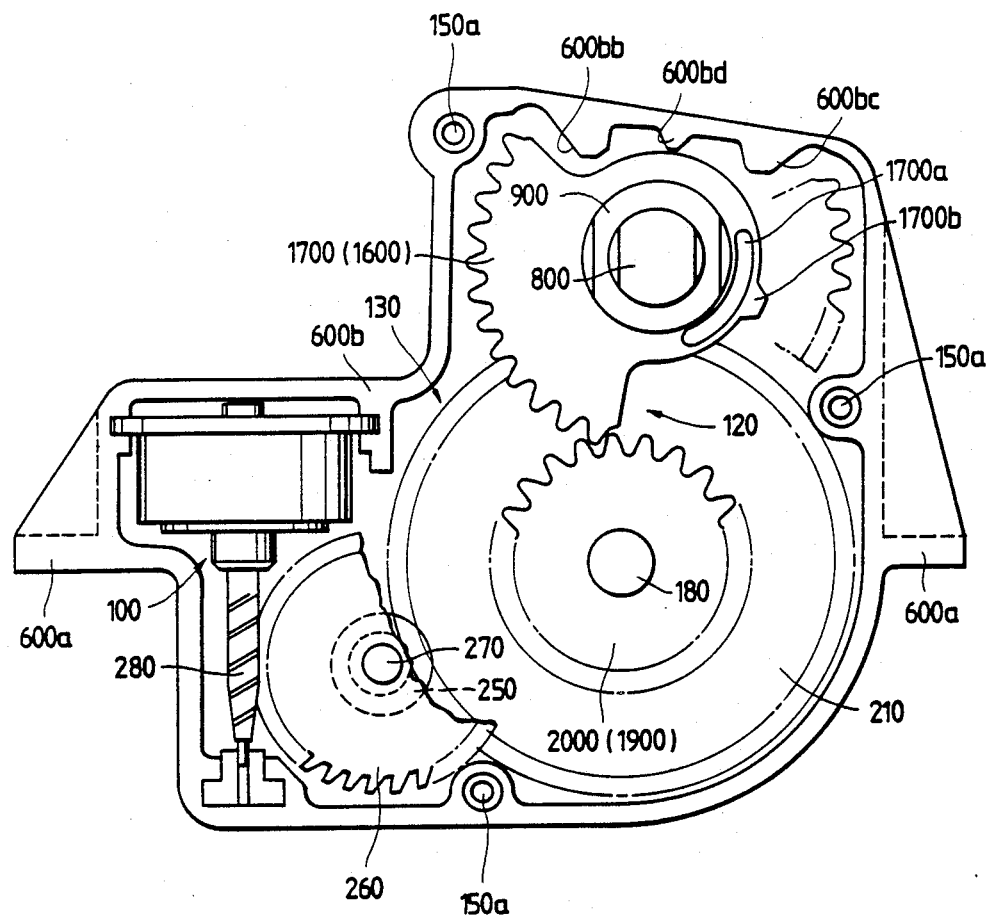
FIG. 50 is a side-elevational View of a third embodiment of the present invention.

A third embodiment of the present invention now will be described with reference to FIG. 50. This embodiment differs from the second embodiment mentioned above in that sector gears 1600 and 1700 are used as the first gears, and in that circular gears 1900 and 2000 are used as the second gears. Since the other parts are the same, they are denoted by the same reference numerals, respectively and will not be explained here. Recesses 1600a and 1700a (only one of which is shown) are formed respectively in the sector gears 1600 and 1700 and extend in the circumferential direction thereof. Positioning projections 1600b and 1700b (only one of which is shown) are formed respectively on those sections of their outer peripheral portions disposed adjacent to the recesses 1600a and 1700a, those sections being elastically deformable. A positioning projection 600bd is formed on a casing body 600b and is disposed in a circular path of angular movement of the projection 1600b 1700b. In the angular positions of the sector gears 1600 and 1700 shown in solid lines, the lid and the seat are disposed at their final stage of movement immediately before reaching the horizontal position, and their teeth have just been brought out of meshing engagement with the second gears Thereafter, in response to the pivotable movement of the seat or the lid in the first direction, the sector gear 1600, 1700 is angularly moved in a clockwise direction until it is brought into engagement with a stopper 600bb, so that the sector gear is held in that position, out of meshing engagement with the second gear 1900, 2000.

When the input shaft 800, 900 (corresponding respectively to the seat or the lid) is angularly moved so that the sector gear 1600, 1700 disposed at the position indicated by the solid line is angularly moved in a second direction (counterclockwise direction), the sector gear is brought into meshing engagement with the second gear 1900, 2000 to rotate it, and is angularly moved toward a position shown by a broken line. At this time, the rotation of the second gear is not transmitted to the third gear 210 since the one-way transmission clutch 110 is provided between the second gear 1900 2000 and the third gear 210. The sector gear 1600 1700 angularly moved to the position indicated by the broken line (the vertical position) is brought out of meshing engagement with the second gear 1900, 2000, with its one side abutted against a stopper 600bc. If the seat or the lid overruns the projection 1600b, 1700b of the sector gear 1600, 1700 goes past the stopper 600bc and is abutted against the positioning projection 600bd, thereby stopping the sector gear.

In this embodiment, when the lid or the seat is moved in the first direction from a vertical to a horizontal position, the sector gears 1600, 1700 disposed in the position indicated by the broken line are angularly moved in a clockwise direction, and are brought into meshing engagement with the second gear 1900, 2000 after being angularly moved through a non-meshing angle of about 10 degrees thereby angularly moving the second gear. The closing speed of the seat and the lid between the vertical position and the angular position of about 10 degrees is as shown in FIG. 49. However, between the angular position of 10 degrees and the final stage of movement (the angular position of about 80 degrees), the closing speed is substantially constant since the gear ratio of the sector gear to the second gear is not changed. When the angle of the pivotable movement reaches the final stage angle of 80 degrees, the sector gear and the second gear become disengaged from each other (see FIG. 50) As a result, the sector gear, and hence the lid or the seat is moved without receiving a braking force and thus descends by its own weight and is brought into abutting engagement with the upper surface of the seat or the upper surface of the lid, respectively.

In the above embodiments, although the pivotable members whose speed is to be regulated are a toilet seat and lid, the invention is applicable to a speed governor for other pivotable members such as a refrigerator door, a door of a building structure, and a video cassette holder. Further, in the illustrated embodiments, although the input shafts are of the double shaft type, a single input shaft may be used. Further, in the illustrated embodiments, since the input shafts constitute one end of axes or centers of rotation (pivotable movement) of the pivotable members, the mounting and removal of the speed governor can be made easily, and exchange of component parts such as those of the brake mechanism can be made quite easily.

As described above, according to the present speed governor for a toilet or the like, since a common structure from the one-way transmission clutch to the brake mechanism can be used, the construction can be simplified. The brake mechanism is not operated when the toilet seat and the toilet lid are lifted because of the one-way clutch and therefore they can be manipulated lightly. Also, the clutch, comprising the coil springs is not noisy.

The braking force is produced through the speed-increasing function of the gear train, and therefore a large braking force is produced with the use of the brake mechanism of a small size.

Particularly where the final stage of the speed-increasing wheel train includes a worm, the speed-increasing rate is increased which is advantageous in braking.

Where the brake mechanism is of the centrifugal type, the times required respectively for three different closing modes (i.e., the closing of the seat, the closing of the lid and the closing of both) do not differ much from one another.

Where a non-circular gear is used in the speed-increasing wheel train, the speed-increasing rate can be changed in a stepless manner, so that a desirable closing operation can be obtained.

Where the rotation is not transmitted to the pivotable member at the initial stage of the pivotable movement of the member from its upper position through a predetermined angle, the closing operation can be initiated with a light force.

Further, in the speed governor of the first embodiment, the number of the component parts is reduced so that the speed governor can be of a compact construction, can be manufactured at a lower cost, and can be assembled easily. Further, since the one-way transmission clutch is provided between the input shaft and the driven rotatable member only the input shaft is rotated when the pivotable member is rotated in the second direction, so that this manipulation can be carried out with a light force. Still further, when both of pivotable members are simultaneously rotated in the first direction, either of the first and second input shafts operate the one-way transmission clutch, and therefore the two pivotable members do not differ in speed of the pivotable movement.

In the speed governor of the second embodiment, the pivotable members can be closed without impact Further, since the brake mechanism is released at the final stage of the angular movement of the input shaft, the seat will not be even slightly spaced upwardly from the upper surface of the body, and when the user is seated on the seat, the seat never descends. Thus, the seat can be used quite conveniently. When the user is seated on the seat slightly spaced from the upper surface of the body, the brake mechanism and the gear train may be damaged or broken. In the present invention, however, the seat is positively held against the upper surface of the toilet bowl, and therefore such a problem is not encountered.

Various modifications within the scope and the spirit of the invention will be apparent to those of working skill in this area of technology. Thus, the scope of the invention is limited only by the appended claims.

What is claimed is:

1. A speed governor for a device having at least first and second pivotable members which are pivotably movable independently of each other the speed governor comprising:
    first and second rotatable members which are rotatable independently of each other in response to respective pivotable movement of said first and second pivotable members;
    a gear train for increasing a speed of rotation of each of said first and second rotatable members and having a plurality of stages including a final stage;
    brake means, mounted on said final stage of said gear train, for braking said pivotable movements of said pivotable members; and
    first and second independent one-way clutches, each provided between a respective one of said first and second rotatable members and said brake means; and
    a common structure, provided from a driven side of each of said clutches to said brake means so that said brake means applies braking force to either of said first and second pivotable members when one of said first and second pivotable members is moved in a first direction, and to both of said first and second pivotable members when both of said pivotable members are moved in said first direction.

2. A speed governor according to claim 1, wherein the final stage of said gear train comprises a worm gear, rotation of said worm gear being braked by said brake means.

3. A speed governor according to claim 2, further comprising a friction member, displaceable under a centrifugal force, at said final stage of said gear train, and a stationary annular sliding-contact surface which is disposed at an area of displacement of said friction member.

4. A speed governor according to claim 1, wherein each of said clutches comprises a coil spring.

5. A speed governor according to claim 1, wherein said gear train includes a plurality of non-circular gears which are meshingly engageable with each other so that the braking force can be varied in a stepless manner.

6. A speed governor according to claim 1, further comprising a friction member, displaceable under a centrifugal force, at said final stage of said gear train, and a stationary annular sliding-contact surface which is disposed at an area of displacement of said friction member.

7. A speed governor according to claim 1, in which rotation of said pivotable members is prevented when each said pivotable member is moved from an upper position thereof to a predetermined angular position thereof.

8. A speed governor according to claim 1, in which a ratio of speed increase is different between each of said pivotable members and a respective one of said clutches.

9. A speed governor according to claim 1, wherein said device is a toilet and said first and second pivotable members are a toilet seat and a toilet lid, respectively.

10. A speed governor according to claim 9, further comprising a gear train having non-circular gears enmeshed with each other so as to vary a braking force applied by said brake means in a stepless manner.

11. A speed governor according to claim 10, wherein the non-circular gears have different sizes so that a speed-increasing ratio is different in different respective stages of the gear train.

12. A speed governor for a toilet said toilet having a toilet seat and a toilet lid, said speed governor comprising:
    first and second independent shafts supported in a casing and projecting outwardly from said casing, said first and second shafts being connected respectively to said toilet seat and said toilet lid;
    means, contained within said casing, for increasing a speed of rotation of said first and second shafts;
    brake means, contained within said casing and connected to said speed increasing means, for decreasing a speed of rotation of said first and second shafts; and
    first and second independent one-way transmission clutches, each provided between a respective one of said first and second shafts and said brake means, so that each of said clutches is operable in response to the operation of a shaft corresponding thereto.

13. A speed governor according to claim 12, in which said first and second shafts are rotatable independently of each other.

14. A speed governor according to claim 12, in which said first and second shafts are disposed coaxially in opposed relation to each other, said speed governor further comprising first and second intermediate one-way transmission clutches to which said first and second shafts are connected through a speed-increasing gear train, and a common structure, provided at the driven sides of said independent one-way transmission clutches and connected to said brake means so that said brake means applies braking force to either of said first and second shafts when one of said first and second shafts is moved in a first direction, and to both of said first and second shafts when both of said shafts are moved in said first direction.

15. A speed governor according to claim 14, in which a ratio of speed increase is different for each of the two pivotable members.

16. A speed governor according to claim 12, further comprising a gear train having non-circular gears enmeshed with each other so as to vary a braking force applied by said brake means in a stepless manner.

17. A speed governor for a toilet having first and second pivotable members each rotatable about an axis of rotation, the speed governor comprising:
 a first input shaft rotatable about said axis of rotation and connected to said first pivotable member;
 a second input shaft rotatable about said first input shaft and connected to said second pivotable member;
 a driven rotatable member rotatable about said axis of rotation;
 a first one-way transmission clutch provided between said first input shaft and said driven rotatable member, said first clutch transmitting a rotation of said first input shaft to said driven rotatable member when said first input shaft is rotated in a first direction, transmission of said rotation of said first input shaft to said driven rotatable member by said first clutch being prevented when said first input shaft is rotated in a second direction opposite said first direction;
 a second one-way transmission clutch provided between said second input shaft and said driven rotatable member, said second clutch transmitting a rotation of said second input shaft to said driven rotatable member when said second input shaft is rotated in a first direction, transmission of said rotation of said second input shaft to said driven rotatable member by said second clutch being prevented when said second input shaft is rotated in a second direction; and
 brake means, connected to said driven rotatable member, for braking said driven rotatable member when said driven rotatable member is rotated, so as to brake a rotation of the one of said first and second input shafts rotating said rotatable member.

18. A speed governor for a toilet having a reciprocally pivotable member, said speed governor comprising:
 an input shaft coupled substantially integrally to said reciprocally pivotable member;
 brake means, responsive to an angular movement of said input shaft, for braking said angular movement of said input shaft
 a one-way transmission clutch, provided between said brake means and said input shaft, for transmitting said angular movement of said input shaft to said brake means when said input shaft is angularly moved in a first direction, transmission of said angular movement of said input shaft to said brake means being prevented when said input shaft is angularly moved in a second direction opposite to said first direction; and
 brake release means, provided between said input shaft and said brake means, for releasing an operation of said brake means at a final stage of said angular movement of said input shaft in said first direction.

19. A speed governor according to claim 18, further comprising a gear train having non-circular gears enmeshed with each other so as to vary a braking force applied by said brake means in a stepless manner.

* * * * *